United States Patent [19]

Hethuin et al.

[11] Patent Number: 5,072,223
[45] Date of Patent: Dec. 10, 1991

[54] RADAR SYSTEM FOR MEASURING THE NEAREST DISTANCE TO AN OBJECT

[75] Inventors: Serge Hethuin, Meudon; Hugues Crepin, Buc, both of France

[73] Assignee: U.S.Philips Corporation, New York, N.Y.

[21] Appl. No.: 625,625

[22] Filed: Dec. 14, 1990

Related U.S. Application Data

[63] Continuation of Ser. No. 548,421, Jun. 28, 1990, abandoned, which is a continuation of Ser. No. 401,572, Aug. 28, 1989, abandoned, which is a continuation of Ser. No. 115,681, Oct. 30, 1987, abandoned.

[30] Foreign Application Priority Data

Oct. 31, 1986 [FR] France .................... 86 15211

[51] Int. Cl.⁵ .................... G01S 13/34; G01S 7/40
[52] U.S. Cl. .................... 342/122; 342/128; 342/85; 342/174
[58] Field of Search .................... 342/85, 87, 122, 128, 342/173, 195, 87, 83, 145, 174, 189

[56] References Cited

U.S. PATENT DOCUMENTS

| | | | |
|---|---|---|---|
| 2,686,302 | 8/1954 | Capelli | 342/122 |
| 3,774,206 | 11/1973 | Rauch | 342/172 X |
| 4,166,289 | 8/1979 | Murtha et al. | 364/200 |
| 4,268,828 | 5/1981 | Cribbs et al. | 342/196 X |
| 4,367,473 | 1/1983 | Marin et al. | 342/128 X |
| 4,566,010 | 1/1986 | Collins | 342/379 X |
| 4,568,938 | 2/1986 | Ubriaco | 342/122 X |
| 4,766,436 | 8/1988 | Crepin et al. | 342/122 |

OTHER PUBLICATIONS

Purdy, "Signal Processing Linear Frequency Modulated Signals", Radar Technology, edited Eli Brookner, Artech House, 1977, pp. 155-162.

*Primary Examiner*—Gilberto Barrón Jr.
*Attorney, Agent, or Firm*—Robert J. Kraus

[57] ABSTRACT

This radar system for measuring the nearest distance "h" comprises transmitting means (9, 7, 5) for transmitting towards an object a frequency-modulated wave, receiving means (15, 17) for receiving the wave after reflection by the object, mixing means (20) for producing a beat-frequency wave between the transmitted wave and the received wave, high-speed digital processing means (30) for effecting a time-frequency transformation operation of the beat-frequency wave; it further comprises management means (50) for providing the user with the value "h" by influencing more specifically the transmitting means and the high-speed digital processing means.

9 Claims, 3 Drawing Sheets

RADAR SYSTEM FOR MEASURING THE NEAREST DISTANCE TO AN OBJECT

This is a continuation of application Ser. No. 548,421, filed on June 28, 1990, now abandoned which is a continuation of application Ser. No. 401,572, filed Aug. 28, 1989, now abandoned which is a continuation of application Ser. No. 115,681, filed on Oct. 30, 1987, now abandoned.

BACKGROUND OF THE INVENTION

The present invention relates to a radar system for measuring the nearest distance "h", to an object comprising transmitting means for transmitting to the object a frequency-modulated wave, receiving means comprising mixing means for receiving the wave after reflection by the object, and for producing a beat-frequency wave between the transmitted wave and the received wave, high-speed digital processing means for effecting a time-frequency transformation of the beat-frequency wave, output means for indicating the distance "h" and management means, there being provided a first connection for connecting the management means to the output means, a second connection for connecting the management means to the receiving means and a third connection for connecting the management means to the high-speed digital processing means.

The field of application intended more particularly by the invention is the determination of the altitude of an aeroplane for which the system is on board the plane whilst the object is constituted by the earth.

For some time it has been endeavoured to utilize digital processing circuits for this distance measuring (see for example the U.S. Pat. No. 4,568,938).

A system of the type mentioned above is described in further U.S. Pat. No. 4,268,828. In this known system management means are utilized constituted by a programmable microprocessor adjusting the receiving means such that the measures for determining "h" can be effected at the appropriate levels and hence the proper data can be supplied to the output means.

However, this known system cannot meet various requirements made on radio altimeters; for example, the condition may be laid down that the radiated power be weakest possible whilst giving a reliable indication; it can likewise be imposed to be of the utmost precision regardless of the level of the radiated power.

SUMMARY OF THE INVENTION

The present invention proposes a radio altimeter having a unique structure which can be adjusted to different conditions.

Therefore, such a system is characterized in that there is provided a fourth connection between the management means and the transmitting means.

Thus, this fourth connection permits adjustment of the transmission parameters, including the transmission level and the characteristics of the frequency modulation. This facility combined with an adapted digital processor allows fulfillment of a large number of conditions.

It should be noted, when setting up a suitable programme for the management means that the user, by redundancy checks, can ascertain the exactness of the determination of "h" by multiplying the measures, that he can detect a failure and that, if this failure is caused by high-speed digital processing means, he can make provisions that the high-speed operations are carried out somewhat more slowly by the management means, which will probably suffice in certain cases.

BRIEF DESCRIPTION OF THE DRAWING

The present invention will be better understood by means of the following description with the accompanying drawing figures in which.

DESCRIPTION OF THE PREFERRED EMBODIMENT

Figure 1:
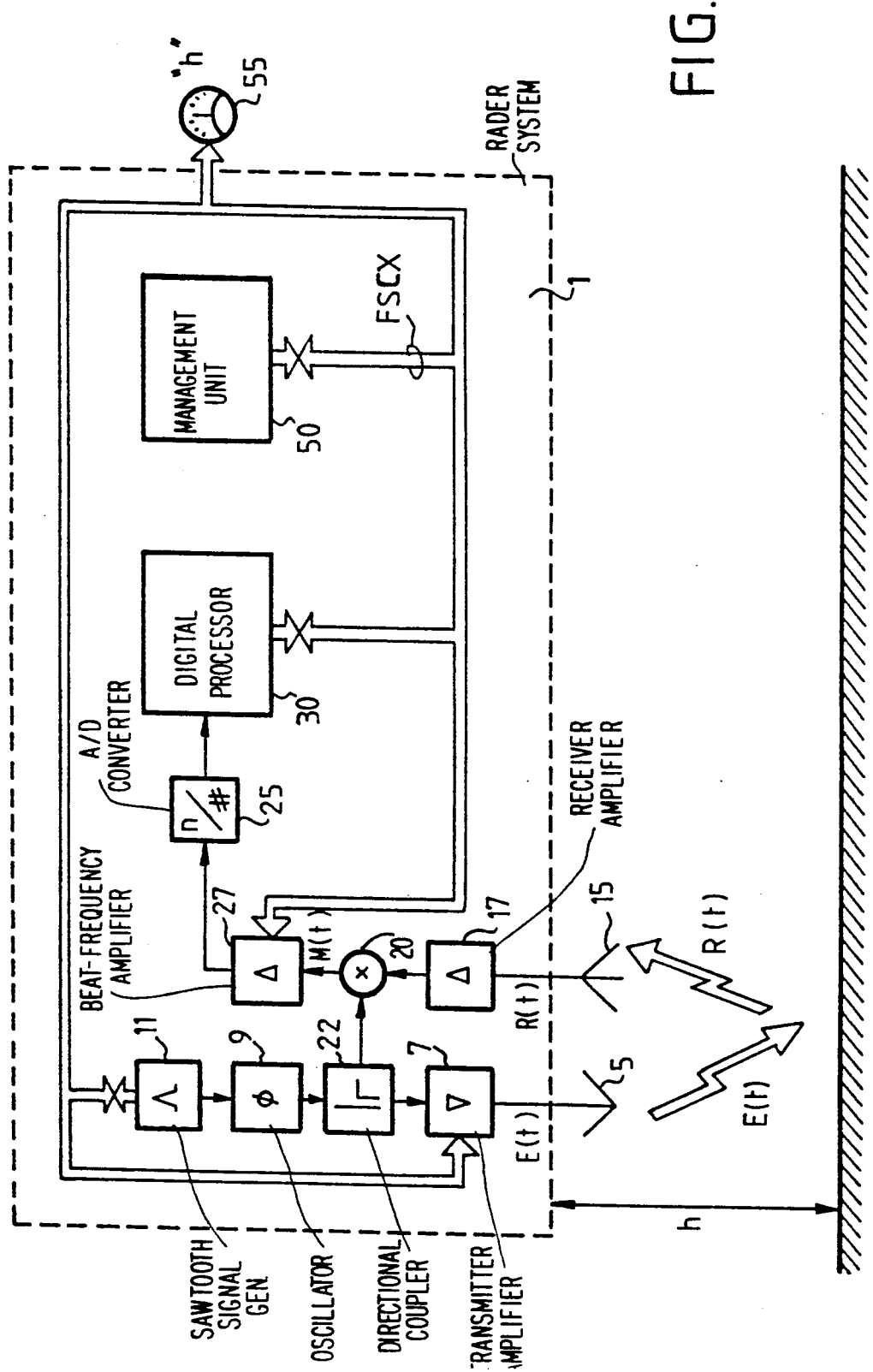
FIG. 1 shows a radar system according to the invention.

Reference numeral 1 in FIG. 1 indicates the system according to the invention. Reference numeral 2 indicates the object separated from the device by a distance "h". In the example under discussion which refers to the anticipated use in radio navigation, the object 2 is the surface of the earth whilst the system 2 is taken on board an airplane which is not shown.

For measuring this distance "h", a linear frequency modulated wave E(t) is utilized starting from a carrier frequency $f_o$ (for example 4 GHz) is a frequency range $\Delta F$, which is described as:

$$E(t) = A \cos\left[ 2\pi \left( f_0 + \frac{\Delta F}{T} t \right) t \right] \quad (1)$$

where t varies in the time intervals T in which the sawtooth signal is generated. A is a constant which defines the amplitude of the wave.

This wave is transmitted into space from a transmitting aerial 5 which is connected to the output of a transmitter amplifier 7. This amplifier 7 amplifies the signal produced by a voltage-controlled oscillator 9. A sawtooth signal generator indicated by reference numeral 11 provides the control voltage for this oscillator 9. The wave E(t) is reflected by the object 2 so that the received wave can be described as:

$$R(t) = B \cos\left[ 2\pi \left( f_0 + \frac{\Delta F}{T} (t - \tau) t \right) \right] \quad (2)$$

where B is a constant which defines a received level and $\tau$ represents the delay between the transmitted wave and the reflected wave.

For receiving this wave R(t), the radar device 1 comprises a receiving aerial 15 and a high frequency receiver amplifier 17.

A mixing circuit 20 establishes the mixing of the received wave amplified by amplifier 17 with the transmitted wave taken off by means of a directional coupler 22 inserted between the oscillator 9 and transmitter amplifier 7. This mixer 20 produces a wave M(t):

$$M(t) = C \cos\left[ 2\pi \frac{\Delta F}{T} \tau t \right] \quad (3)$$

where C represents a constant.

From the frequency "fb" of the signal M(t) the distance "h" is deduced:

$$fb = \tau \frac{\Delta F}{T} \text{ or } \tau = \frac{2h}{c}$$

(c=the velocity of light) where:

$$h = \frac{fb \cdot c}{2\Delta F} T \quad (4)$$

The signal M(t) is advantageously processed in a digital form; therefore, an analog-to-digital converter 25 is provided for converting this signal M(t) which has previously been subjected to an amplification caused by a beat-frequency amplifier 27.

The analog-to-digital converter 25 supplies digital samples to a high-speed digital processor 30 which is provided for forming frequency spectrums. Then, these spectrums are processed by a management unit 50 so that the user receives the value of the distance "h" on an indicator.

The radar system comprises a management unit 50 for supplying, more specifically, to the user the value "h" by means of a display unit 55 and for controlling more specifically, the sawtooth signal generator 11 and also the high-speed digital processor. In addition, the management unit controls the level of the transmitted wave by acting on a delay control incorporated in the transmitter amplifier 7. In order to show that these elements are controlled by the management unit, a bundle FSCX is shown in the figures which connects them to the management unit 50. It will be obvious that in practice the different connections between the elements and the management unit cannot run along the same path and therefore do not necessarily have the physical aspect of a bundle of wires.

Figure 2:
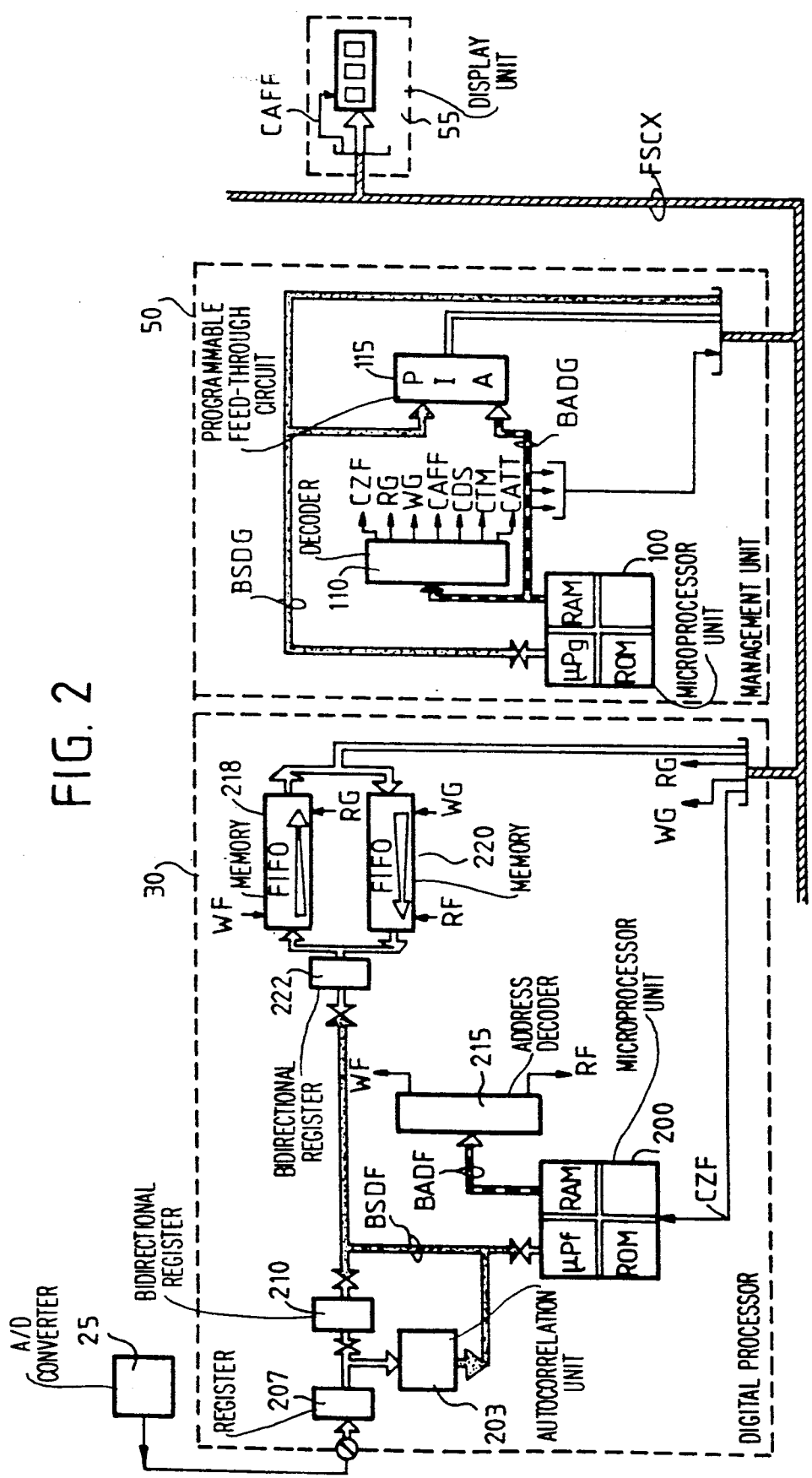
FIG. 2 shows in more detail the high-speed processing means connected to the management means and to the display unit.

In FIG. 2 is shown in more detail the management unit 50, the high-speed digital processor 30 and the display unit 55.

The management unit is constituted around a microprocessor unit 100 comprising, as is well known, the microprocessor commonly referred to as μPg (for example the 6809 manufactured by MOTOROLA), a working store RAM and a fixed store ROM in which the desired program is written by the user. This unit is communicated with by means of a line BSDG for transmitting data and a line BADG for transmitting address codes.

The unit 50 comprises a decoder 110 decoding the address codes transmitted through the line BADG; this decoder producing different signals CZF, CAFF, RG, WG, CDS, CTM, CATT which are transmitted towards different elements of the radar device according to the invention by means of the bundle FSCX. The unit 50 also comprises a programmable feed-through circuit 115 (for example the registered circuit 6820, manufactured by MOTOROLA) whose accesses are connected to the wires forming part of the bundle FSCX.

The digital processor is also formed by a microprocessor unit 200 comprising a microprocessor properly called high-speed microprocessor (for example the TMS 320, manufactured by Texas Instruments) a fixed store ROM and a working store RAM; this unit being intended to effect Fast Fourier Transforms (one may be referred to the article by SURENDER HAGAR et al entitled "μC builds FFT band spectrum analyzer", published in "Signal processing with the TMS 320", edited by Texas Instruments). The Fourier Transform is effected on the output signals of an autocorrelation unit 203 of a type described in Applicant's French Patent Application No. 85 12 337, filed Aug. 13, 1985, corresponding to U.S. Pat. No. 4,791,599. The output signals of this unit are transmitted through a data transmission line BSDF connected to unit 200. The signal autocorrelation input of this unit is connected to the output of the analog-to-digital converter 25 by means of a register 207. A bidirectional register 210 connects this input to the line BSDF. Thus it is possible to test the proper functioning of the unit 203. Therefore, the register 207 is blocked and previously established data coming from unit 200 can be injected into the unit 203 and, from there, it is possible to verify whether these data have been correlated correctly. Further is provided an address decoder 215 connected to the line BADF transmitting address codes coming from unit 200; this decoder 215 produces more specifically signals WF and RF. The digital processor 30 is connected to bundle FSCX by means of two memories 218 and 220 of the type first-in, first-out (FIFO memory of the type LS222). The input of the memory 218 is connected to the line BSDF by means of a bidirectional register 222 and its output to the line BSDG by means of the bundle FSCX. The input of the memory 220 is connected to the line BSDG always by means of the bundle FSCX, whilst its output is connected to the line BSDF by means of register 222. The signals WF and RF, respectively, allow to write in the memory 218 and to read in the memory 220, the write and read data relating to microprocessor unit 200. The signals WG and RG travelling through the bundle FSCX allow to write in the memory 220 and to read the contents of memory 218, respectively, the latter read and write data relating to microprocessor unit 100. The signal CZF travelling through the line FSCX can be utilized for activating or reactivating microprocessor unit 200.

The display unit 55 displays the result provided by microprocessor unit 100 via the line BSDG and the bundle FSCX. The signal CAFF assigned to unit 55 determines the destination of the data transmitted by the line BSDG.

Figure 3:
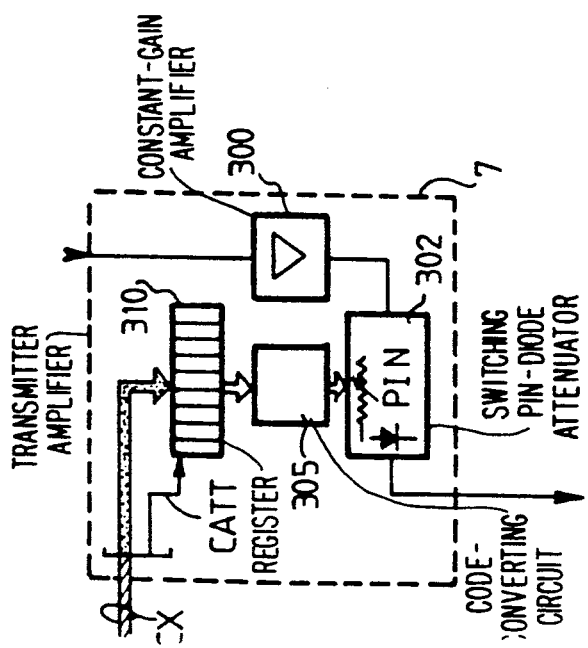
FIG. 3 shows the level control of the transmitting means.

In FIG. 3 is shown a manner in which the transmission level could be controlled by operating the transmitter amplifier 7. This amplifier is formed by a constant-gain amplifier 300 followed by a switching PIN-diode attenuator 302. The switching of these diodes is determined by a code-converting circuit 305 converting into a change-over code the continuous code in a register 310. The inputs of this register 310 are connected to the line BSDG by means of the bundle FSCX. In order that the data transmitted through these lines are written in the register 310, the signal CATT travelling through the bundle FSCX has to be active.

Figure 4:
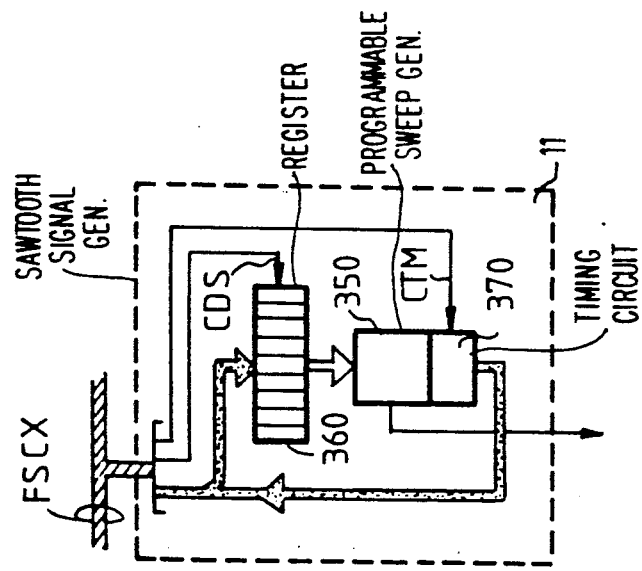
FIG. 4 shows the frequency control of the transmitting means.

In FIG. 4 is shown how the sawtooth signal generator is controlled by the management unit 50. The generator is devised around a programmable sweep generator 350 described in the European Patent Specification No. 113 975. The duration of the sawtooth signals is determined by a code contained in the register 360. The inputs of this register 360 are connected to the line BSDG by means of the bundle FSCX when the signal CDS also travelling through the bundle is active. A timing circuit 370 is added to the circuit 350. This timing circuit 370 (for example the circuit designated 6840 manufactured by MOTOROLA) determines the actual duration of the sawtooth signal and this duration is passed on to the management unit by means of the line BSDG comprised in the bundle FSCX. This communication only takes place if the signal CTM travelling through the bundle FSCX is active.

Figure 5:
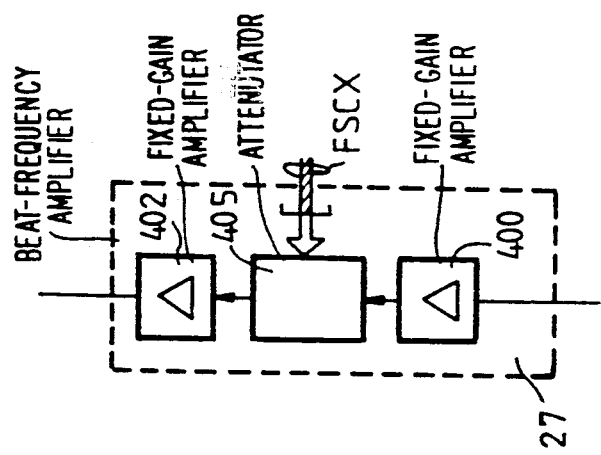
FIG. 5 shows the gain control of the receiving means.

In FIG. 5 is shown the manner in which the gain of the receiver amplifier 27 is varied. This amplifier is comprised of two fixed gain amplifiers 400 and 402 arranged in cascade and having an attenuator 405 mounted between them. This attenuator is in fact a logarithmic digital-to-analog converter (for example of the type designated AD7118); this converter produces an output signal which depends as much on the input code as on the input signal. The input code originates from the circuit 115 and travels through the bundle FSCX.

The structure of the system according to the invention allows satisfaction of the most diverse wishes of the user by the programming. For example:

By controlling the generator 11 the time T can be varied (and the subsequent measuring by the timing circuit 370 for more precise computations) such that the frequency fb (see formula (4) remains within the limits suitable for the processing by the high-speed digital processor 30.

By controlling the transmission level by means of the attenuator 302 (FIG. 3) a lowest possible transmission level can be achieved, compatible with accurate measurement of "h", which allows less disturbance of adjacent devices.

By controlling the gain of the amplifier 27, the amplitude of the signals to be processed by the digital processor 30 is adjusted to its optimal value.

The management unit 50 can initiate a test of the digital processor 30 and to detect failures of the latter.

What is claimed is:

1. A radar system for measuring a distance h from the system to an object, comprising:
   a. signal production means including transmitting means for producing a frequency modulated transmitted signal and directing said signal toward the object and receiving means coupled to the transmitting means for receiving a reflection of the transmitted signal from the object and producing a beat frequency signal;
   b. digital processing means coupled to the signal production means for performing a first time frequency transformation of the beat frequency signal; and
   c. management means coupled to the signal production means and to the digital processing means, said management means including means for ensuring the reliability of the measurement of the distance h by:
      (1) effecting adjustment of at least one characteristic of the transmitted signal to maintain a corresponding characteristic of the beat frequency signal within limits suitable for processing by the digital processing means;
      (2) detecting a failure of the digital processing means to accurately perform the transformation of the beat frequency signal;
      (3) upon detection of said failure, performing a second time frequency transformation of the beat frequency signal; and
      (4) determining the distance h from one of said first and second time frequency transformations.

2. A radar system for measuring a distance h from the system to an object, comprising:
   a. transmitting means for producing a frequency modulated transmitted signal and directing said signal toward the object;
   b. receiving means coupled to the transmitting means for receiving a reflection of the transmitted signal from the object and producing a beat frequency signal;
   c. digital processing means coupled to the receiving means for performing a first time frequency transformation of the beat frequency signal; and
   d. management means coupled to the transmitting means, to the receiving means and to the digital processing means, said management means comprising means for ensuring the reliability of the measurement of the distance h by:
      (1) effecting adjustment of at least one characteristic of the transmitted signal to maintain a corresponding characteristic of the beat frequency signal within limits suitable for processing by the digital processing means;
      (2) detecting a failure of the digital processing means to accurately perform the transformation of the beat frequency signal;
      (3) upon detection of said failure, performing a second time frequency transformation of the beat frequency signal; and
      (4) determining the distance h from one of said first and second time frequency transformations.

3. A radar system as in claim 1 or 2 where the transmitting means includes an oscillator having an input for effecting frequency modulating control of the transmitted signal and where the management means is coupled to said input for effecting adjustment of the modulation of the transmitted signal to maintain the frequency of the beat frequency signal within limits suitable for processing by the digital processing means.

4. A radar system as in claim 3 including a periodic signal generator for applying a modulation control signal to the input of the oscillator, said management means being coupled to said input by means of said periodic signal generator.

5. A radar system as in claim 1 or 2 where the management means includes a microprocessor.

6. A radar system as in claim 1 or 2 where the digital processing means includes a microprocessor for performing Fast Fourier Transforms.

7. A radar system as in claim 1 or 2 where the digital processing means includes first-in-first-out memory means for facilitating the transfer of digital information between the management means and said digital processing means.

8. A radar system as in claim 1 or 2 where the transmitting means includes amplifier means capable of adjusting the magnitude of the transmitted signal, said amplifier means having an input to which the management means is coupled for effecting adjustment of said magnitude.

9. A radar system as in claim 1 or 2 where the receiving means includes amplifier means capable of adjusting the magnitude of the beat frequency signal, said amplifier means having an input to which the management means is coupled for effecting adjustment of said magnitude.

* * * * *